Figure 4:
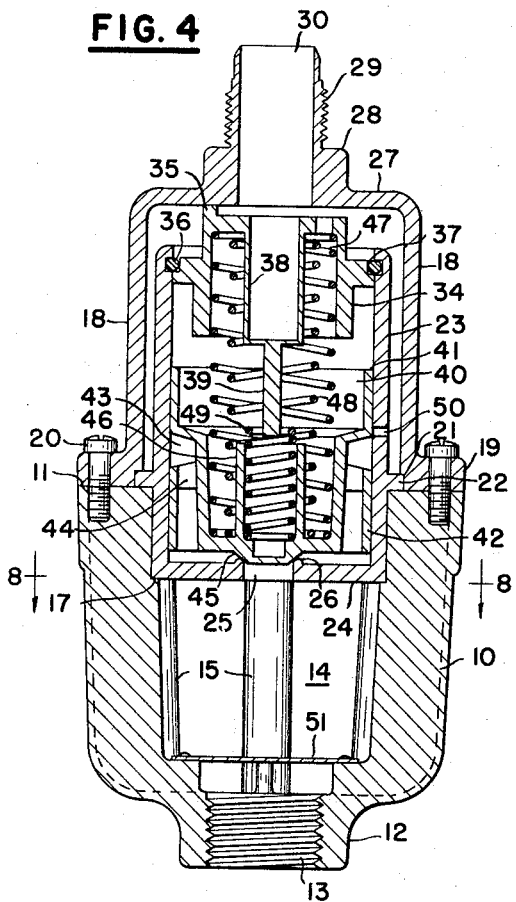

March 28, 1967  J. O. DRAKE  3,311,098
ENGINE RECTIFIER
Filed Dec. 18, 1964  2 Sheets-Sheet 1
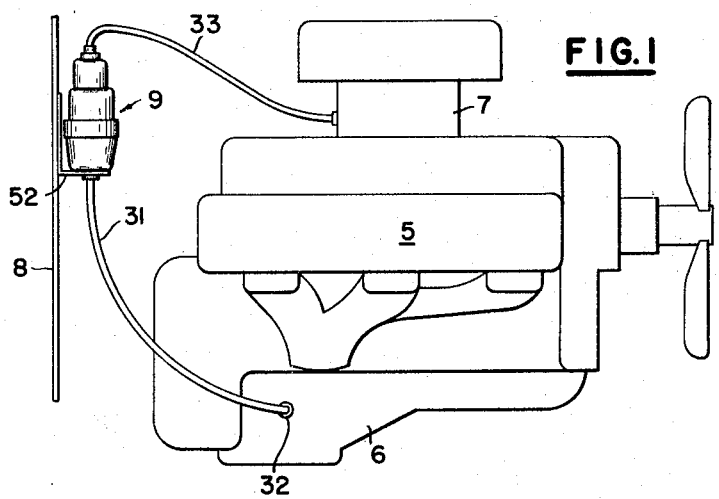
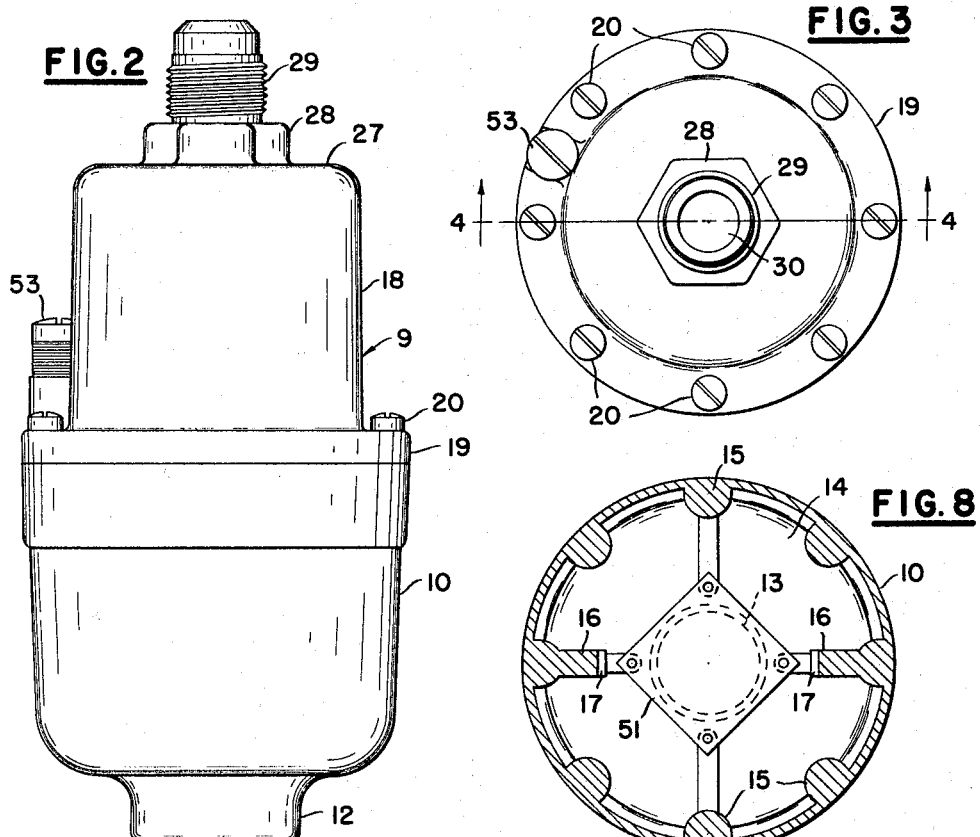
INVENTOR.
JESSE O. DRAKE
BY
ATTORNEY March 28, 1967 J. O. DRAKE 3,311,098
ENGINE RECTIFIER Filed Dec. 18, 1964  2 Sheets-Sheet 2

INVENTOR.
JESSE O. DRAKE
BY
*James N. Gee*
ATTORNEY

3,311,098
ENGINE RECTIFIER
Jesse O. Drake, 759 Caroline Ave.,
West Palm Beach, Fla. 33404
Filed Dec. 18, 1964, Ser. No. 419,489
6 Claims. (Cl. 123—119)

This invention relates to a rectifier for internal combustion engines.

The rectifier of this invention due to its construction and assembly with respect to the engine completely revitalizes the performance of any automobile or other type of gasoline internal combustion engine, greatly extends the life of the engine by eliminating dilution, considerably increases mileage, affording substantial saving in gasoline, improves power and acceleration, eliminating oil changing, insures upper cylinder lubrication, removes carbon deposits within the explosive chambers, prevents the sticking of valves and saves engine repairs and consequent loss of time and revitalizes the operation of the vehicle to an extent that was never contemplated when the engine was constructed.

The rectifier consists of a condensing chamber, the entry of which is connected by a pipe to the engine crank case and a pipe leading from the top of the rectifier to either the intake manifold of the engine or the carburetor supported thereon.

Automotive engineers are all in agreement that the dilution of the lubricating oil (which is in the crank case) with gasoline, water and sulphur are the prime causes of ineffective lubrication and the purpose of this invention is to remove the accumulated gases within the crank case and to re-circulate them through the intake manifold or carburetor to be reburned. Gasoline, water, and sulphur diluents destroy the viscosity and lubricating qualities of the oil, allowing the metal parts of bearings and shafts, as well as piston rings, cylinders to come together, causing much metallic friction and wear, necessitating the expense of cylinder regrinding, new piston rings and bearing adjustments, to restore the engine to reasonable working condition.

While the engine is idling, this diluted oil is drawn from the crank case, past the piston rings into the combustion chamber, is burned and deposited as carbon on the piston and cylinder head and on the valves. Hard carbon particles break away from the deposits and become lodged between the valves and valve seats, destroying the compression, pitting and burning away the valves and valve seats, necessitating frequent dismantling of cylinder heads and reseating or renewing of valves which quickly give trouble again due to the same cause.

The rectifier of this invention eliminates the foregoing troubles since, while the engine is running, the crank case becomes filled with vapors of water, gasoline and light oils which vaporize due to the heat of the bearings, the pistons and the crank case. These vapors are passed through the rectifier which separates the high viscosity lubricating oil from the vapors and returns it to the crank case. The lighter oils pass through for oiling of the valves and freeing them from any sticking condition and then pass into the cylinder for the purpose of upper cylinder lubrication, which oils, being solvents, soften the carbon and assist in its removal. The water vapors in the form of steam pass through the rectifier and have a further effect of loosening the carbon deposit. The gasoline vapors are used to give power, and the free oxygen of the air then drawn from the crank case under the heat of the explosion, consumes and prevents the further formation of carbon. This, together with efficient lubrication, practically prevents all wear of the piston rings, cylinder and valves. The air entering the crank case to replace the vapors which have been removed, cools the working parts and the lubricating oil, which is a further benefit for the easy running of the engine.

The mixture of combustible gas, together with the gasses drawn from the crank case, on test, gives a greatly increased power and pick-up to the engine.

The engine rectifier of this invention performs the following:

(1) Gives considerable increase in power.
(2) Gives more mileage per gallon of gasoline if tested under similar conditions and speed before and after installation.
(3) Removes carbon and reconditions engine.
(4) Maintains oil in the crank case of maximum efficiency at all times and at approximately ¼ the cost.
(5) Adds years to the life and services of the engine.
(6) Saves 75% of engine repair and labor costs.
(7) Insures upper cylinder lubrication.
(8) Prevents sticking valves.

Figure 5:
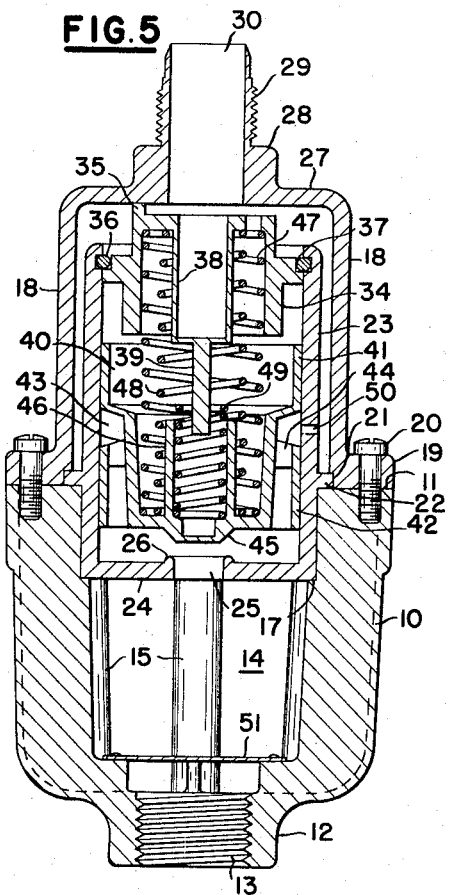
Figure 6:
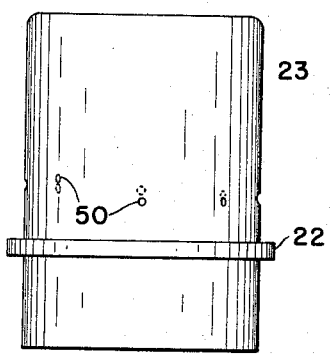
Figure 7:
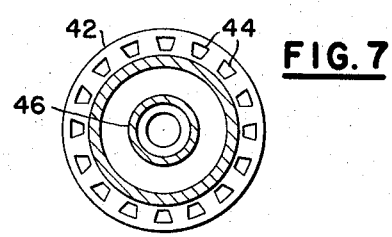

In the accompanying drawings wherein has been illustrated a preferred form of the device, FIGURE 1 is a side elevational view of an internal combustion engine showing the invention applied thereto, FIGURE 2 is an enlarged side elevational view of the rectifier, FIGURE 3 is a top plan view thereof, FIGURE 4 is a central vertical sectional view taken substantially on line 4—4 of FIGURE 3 illustrating the parts in a first inoperative position, FIGURE 5 is a view similar to FIGURE 4 but showing the parts shifted to an operative position, FIGURE 6 is a side elevation of a cylinder embodied in the device, FIGURE 7 is a horizontal section through a piston embodied in the invention, and FIGURE 8 is a horizontal section taken substantially on line 8—8 of FIGURE 4.

Referring specifically to the drawings, there has been illustrated an internal combustion engine 5, having the usual crank case 6 and a carburetor 7.

Fixed upon a wall 8 of the vehicle is a rectifier, illustrated as a whole by the numeral 9. The rectifier includes a lower slightly tapered shell 10, open at its upper end and provided with a flat top 11. The shell 10 at its lower end is provided with a tubular reduced extension 12 that is bored axially and threaded, as indicated at 13. The shell 10 is chambered at 14 and with the chamber communicating with the threaded bored 13. The chamber 14 at equidistantly spaced points is provided with ribs 15 and two diametrically opposite ribs 15 are provided with extensions 16, having flat shoulders 17, for a purpose to be presently described.

Adapted to be fixed upon the top of the shell 10, is a cylindrical housing 18, flanged at its lower end as indicated at 19 and bolted to the shell 10 by spaced apart screws 20. The lower open end of the housing 18 is grooved at 21 to clampingly receive a circumferential rib 22 of a cylindrical fixed shell 23. The bottom 24 of the shell 23 is provided with an axial opening 25, having a valve seat 26. The upper end 27 of the housing 18 is provided with a reduced cylindrical extension 28 that is externally threaded at 29 and the extension is bored at 30. Connected to the extension 12 in a threaded manner, is a tube 31 that has connection with a side wall of the crank case 6 as at 32 and having communication with the interior thereof. The upper threaded end 29 of the housing 18 is threadedly connected to a tube 33, that may be connected into the carburetor 7 or it may be connected to an intake manifold of the engine. The tube 33 is a vacuum tube from the carburetor and functions to cause gaseous mixtures within the crank case to pass upwardly through the rectifier to be re-circulated through the firing chamber of the engine as previously indicated.

Yieldable and slidable within the shell 23 is a tubular cup 34 open at its toom and with the cup being spaced from the inner side of the top 27 by lugs 35. The cup 34 is held against upward displacement from the shell 23 by a split ring 36, seating within a groove 37 formed adjacent the upper open end of the shell 23. The cup 34 is provided with a downwardly extending closed tube 38 having a pin 39 projecting downwardly and axially with the tube. The clamping of the rib 22 between the housing 18 and the shell 10 disposes the shell 23 in such position that the cup 24 has its top in spaced relation to the inner side of the top portion 27 of the housing and to provide a flow passage from the lower chamber 14 upwardly through the shell 23 in a manner to be presently described.

Slidable under the influence of vacuum created in the engine, is a piston 40 having an upper piston head 41 and a lower piston head 42 that is defined by a circumferential groove 43. The head 42 is provided with a circumferential row of apertures 44 that communicate with the groove 43 and the bottom of the head 42. The head 42 upon its bottom is provided with a tapered valve 45, normally adapted to engage the taper seat 26 of the bottom 24 of the shell 23. The bottom of the head 42 is provided with an upwardly extending tubular socket 46.

A spring 47, has one end seated within the cup 34 and its opposite end bearing against the bottom of the head 42 whereby to bias the piston 40 downwardly toward the valve seat 26 and to bias the cup 34 upwardly toward the head 27 where it is spaced therefrom by the lugs 35 and a second spring 48 engages over the tubular extension 38 of the cup 34 and over the tubular socket 46 and with the springs being so tensioned as to jointly cushion the movement of the piston 40 in a downward direction and in an upward direction determined by the vacuum created by the engine. A third cushion spring 49 seats within the socket 46 and cushions the downward movement of the cup 34. The shell 23 in its side wall, is provided with a plurality of staggered apertures 50 that are adapted to be covered and uncovered by the piston 40.

Overlying the threaded aperture 13 in the lower shell 10, is a baffle plate 51 that constitutes a spreader for the gases that are cause to be extracted from the crank case 6 evenly into the chamber 14 and the baffle plate 51 may be fixed to extensions of the ribs 15, as clearly shown.

In the use of the device, with the device fully assembled, as illustrated in FIGURES 4 and 5 and with the device being mounted in any desirable position with respect to the engine 5 but, at an elevation above the crank case 6 by any suitable bracket 52, the pipes 31 and 33 are connected as is indicated to the rectifier at top and bottom and the pipe 31 is connected to the crank case above the level of the oil therein, either by drilling and tapping an opening in the side wall of the crank case while the tube 33 may be connected to the carburetor in any suitable manner or may be connected to the intake manifold of the engine by drilling and tapping. With the engine in operation, a vacuum is created through the tube 33, moving the piston 40 upwardly and causing the valve 45 to leave the seat 26 whereby the suction is created in the chamber 14 and through the tube 31, extracting the undesirable gasses from the crank case 6. The gasses pass upwardly through the aperture 25 and through the apertures 44 of the piston head 42 where they flow through any particular group of apertures 21 of the shell 23 and, since the shell 23 is spaced from the side wall of the housing 18, the gasses will flow upwardly through the housing and the shell to flow past the head of the cup 34 and through the tube 33 to be reinjected into the carburetor or manifold where they create a very desirable lubrication for the valves of the engine and to be subsequently burned in the cylinders. The desirable functions of the device have been clearly pointed out in the preamble to the specification and the operation of the device will be entirely clear and requires no adjustment. Should any parts of the valve mechanism be frozen against movement by any varnish or similar substance within the gasses, there has been provided a screw 53, threaded into an opening formed in the flange 19 and communicating with the interior of the chamber 14 whereby any type of solvent may be injected therein to readily free the several parts.

It is to be understood that the invention is not limited to the precise construction shown, but that changes are contemplated as readily fall within the spirit of the invtntion as shall be determined by the scope of the subjoined claims.

I claim:

1. A rectifier device for use in connection with internal combustion engines having a fuel inlet and an oil containing crank case, the rectifier being mounted adjacent to the engine and with the rectifier having a tube connected to its lower end and also to the crank case above the level of the oil therein, the rectifier also having a tube connected to the fuel inlet side of the engine, the rectifier embodying upper and lower cylindrical housings that are bolted togehter, the upper housing having a closed end that is provided with a threaded coupling for connection to the tube leading to the fuel inlet of the engine, the lower housing having a threaded opening in its bottom for threaded connection to the tube leading to the crank case, the upper housing at its lower end being provided with a circumferential flange that is apertured to receive bolts that are connected to threaded openings in the lower housing and whereby the housings are fixedly bolted together, the upper housing being provided with a cylinder that is closed at its lower end and open at its upper end, the cylinder being provided at its lower end with a circumferential rib that is clamped between the housings, the cylinder being co-axial to the housings and spaced from side walls of the upper housing, the bottom of the cylinder being provided with a central opening that is beveled to constitute a seat for a check valve, a piston operable in the cylinder and with the piston centrally thereof provided with a beveled valve that seats upon the bevel of the opening of the cylinder, the cylinder at its upper end being provided with a cup-shaped cylindrical member and means for retaining the cup shape member against upward movement with respect to the cylinder, the said piston being biased downwardly by a spring that seats against the piston and also seats within the cup-shaped member to bias the piston downwardly, the cup-shaped member upon its upper surface being provided with spacing lugs whereby the cup-shaped member is held in spaced relation to the top of the upper housing, the said piston being provided with a partition that is apertured at spaced apart points and the cylinder also being provided with staggered rows of apertures that communicate with the apertures of the piston, the upper housing being provided with a tubular opening passing through the threaded coupling and communicating with the interior of the upper housing, the said piston being biased upwardly by a vacuum that is created in the tube leading to the fuel inlet side of the engine and whereby to open the valve in the bottom of the cylinder and to permit the suction of gases from the crank case, the said gases passing through the apertures of the piston and through the apertures of the cylinder to flow upwardly to be discharged to the inlet side of the engine to be subsequently burned and to lubricate the upper cylinder structure of the engine.

2. The structure according to claim 1 wherein the cylinder projects downwardly into the lower housing and with the lower housing being provided with a plurality of ribs upon its side walls and with one pair of ribs constituting a seat for the cylinder.

3. The structure according to claim 1 wherein a cup-shaped member is held within the upper end of the cylinder by an O-ring that engages a flange upon the cup-shaped element and also seats within a groove formed in the cylinder adjacent its upper end.

4. The structure according to claim 1 wherein an inner concentric spring bears within the cup-shaped element and also upon the inner bottom of the piston.

5. The structure according to claim 1 wherein the piston is provided with a tubular upstanding socket that receives a cushion spring that bears against a pin projecting downwardly from the cup-shaped element.

6. The structure according to claim 1 wherein the tube communicating with the crank case enters the lower housing and a baffle plate disposed over the inlet for the lower tube to spread gases from the crank case into the lower housing for passage through the opening of the cylinder when the piston is biased upwardly by a vacuum created by the inlet of the engine, the said cup-shaped element having a tubular downwardly extending cup that is open upon the top of the cup-shaped element and with the cup carrying a downwardly extending pin that engages a cushion spring within the piston, the said piston being biased upwardly against the first and second named springs to permit the passage of gases from the crank case through the aperture of the bottom of the cylinder and to pass upwardly through the apertures of the piston and around the cylinder to flow upwardly and through the tube connected to the inlet side of the engine.

References Cited by the Examiner

UNITED STATES PATENTS

| | | | |
|---|---|---|---|
| 1,177,656 | 10/1930 | Silva | 123—119 |
| 2,592,380 | 4/1952 | Beckett | 137—153 |
| 3,105,471 | 10/1963 | MacPherson et al. | 123—119 |
| 3,165,097 | 1/1965 | Lowther | 123—119 |
| 3,198,208 | 8/1965 | Tramontini | 137—480 |

MARK NEWMAN, *Primary Examiner.*

AL LAWRENCE SMITH, *Examiner.*